United States Patent
Jia et al.

(10) Patent No.: US 11,113,536 B2
(45) Date of Patent: Sep. 7, 2021

(54) VIDEO IDENTIFICATION METHOD, VIDEO IDENTIFICATION DEVICE, AND STORAGE MEDIUM

(71) Applicant: BOE TECHNOLOGY GROUP CO., LTD., Beijing (CN)

(72) Inventors: Honghong Jia, Beijing (CN); Yanzhen Cui, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 85 days.

(21) Appl. No.: 16/523,124

(22) Filed: Jul. 26, 2019

(65) Prior Publication Data
US 2020/0293786 A1    Sep. 17, 2020

(30) Foreign Application Priority Data
Mar. 15, 2019  (CN) .......................... 201910197160.2

(51) Int. Cl.
| | |
|---|---|
| G06K 9/00 | (2006.01) |
| G06F 16/75 | (2019.01) |
| G06N 3/04 | (2006.01) |
| G06N 3/08 | (2006.01) |
| G06N 20/20 | (2019.01) |

(52) U.S. Cl.
CPC ......... *G06K 9/00744* (2013.01); *G06F 16/75* (2019.01); *G06N 3/04* (2013.01); *G06N 3/08* (2013.01); *G06N 20/20* (2019.01)

(58) Field of Classification Search
CPC ...... G06K 9/00744; G06N 20/20; G06N 3/04; G06N 3/08; G06F 16/75
See application file for complete search history.

(56) References Cited

U.S. PATENT DOCUMENTS

| | | | |
|---|---|---|---|
| 9,848,112 B2* | 12/2017 | Piekniewski | ........ H04N 5/2258 |
| 10,289,912 B1* | 5/2019 | Vijayanarasimhan | ...................... G06K 9/00718 |
| 10,740,985 B2* | 8/2020 | Sommerlade | ........ G06N 3/0454 |

(Continued)

FOREIGN PATENT DOCUMENTS

| | | |
|---|---|---|
| CN | 105976400 A | 9/2016 |
| CN | 106599789 A | 4/2017 |

(Continued)

OTHER PUBLICATIONS

Yang et al. "Multilayer and Multimodal Fusion of Deep Neural Networks for Video Classifications" ACM Oct. 15-19, 2016 pp. 1-10.*

(Continued)

*Primary Examiner* — Mia M Thomas
(74) *Attorney, Agent, or Firm* — The Webb Law Firm

(57) ABSTRACT

The present disclosure provides a video identification method, a video identification device and a storage medium. The video identification device extracts an image and an optical flow from a video, classifies the image by using a first machine learning model to obtain a first classification result, classifies the optical flow by using a second machine learning model to obtain a second classification result, wherein a depth of the first machine learning model is larger than a depth of the second machine learning model, and fuses the first classification result and the second classification result to obtain the identification result of the video.

17 Claims, 5 Drawing Sheets

(56) References Cited

U.S. PATENT DOCUMENTS

| | | | |
|---|---|---|---|
| 2010/0030578 A1* | 2/2010 | Siddique | G06Q 40/12 705/3 |
| 2013/0215116 A1* | 8/2013 | Siddique | G06Q 20/204 345/420 |
| 2017/0109584 A1* | 4/2017 | Yao | H04N 21/4666 |
| 2017/0132496 A1* | 5/2017 | Shoaib | G06N 3/063 |
| 2017/0185872 A1* | 6/2017 | Chakraborty | G06K 9/66 |
| 2018/0247126 A1* | 8/2018 | Li | G06K 9/6215 |
| 2019/0295282 A1* | 9/2019 | Smolyanskiy | G01S 13/867 |
| 2020/0134425 A1* | 4/2020 | Chen | G06N 3/084 |
| 2020/0160064 A1* | 5/2020 | Wang | G06K 9/6297 |
| 2020/0160087 A1* | 5/2020 | Redmon | G06K 9/20 |
| 2020/0193589 A1* | 6/2020 | Peshlov | G06K 9/00986 |
| 2020/0218979 A1* | 7/2020 | Kwon | B60W 60/0011 |
| 2020/0394413 A1* | 12/2020 | Bhanu | G06K 9/6267 |
| 2020/0394752 A1* | 12/2020 | Liu | G06N 5/046 |

FOREIGN PATENT DOCUMENTS

| | | |
|---|---|---|
| CN | 107168527 A | 9/2017 |
| CN | 107239733 A | 10/2017 |
| CN | 107341480 A | 11/2017 |
| CN | 107463949 A | 12/2017 |
| CN | 108154196 A | 6/2018 |

OTHER PUBLICATIONS

Ye et al., "Evaluating Two-Stream CNN for Video Classification", ICMR '15: Proceedings of the 5th ACM on International Conference on Multimedia Retrieval, Jun. 2015, pp. 435-442, https://doi.org/10.1145/2671188.2749406.

Shi, Shiwei, Research on Video Behavior Recognition Based on Deep Learning, Full Text Database of Chinese Excellent Master Degree Thesis Information Series, 2Jun. 15, 2018, pp. 62-63, No. 6.

* cited by examiner

VIDEO IDENTIFICATION METHOD, VIDEO IDENTIFICATION DEVICE, AND STORAGE MEDIUM

CROSS-REFERENCE TO RELATED APPLICATIONS

This application is based on and claims priority to Chinese Application No. 201910197160.2, filed on Mar. 15, 2019, the disclosed content of which is incorporated in the present application in its entirety.

TECHNICAL FIELD

The present disclosure relates to the field of image processing, and in particular, to a video identification method, a video identification device, and a storage medium.

BACKGROUND

In the related art for identifying a video, content in the video is identified by directly identifying images in video frames.

SUMMARY

According to a first aspect of an embodiment of the present disclosure, there is provided a video identification method including: extracting an image and an optical flow from a video; classifying the image by using a first machine learning model to obtain a first classification result; classifying the optical flow by using a second machine learning model to obtain a second classification result, wherein a depth of the first machine learning model is larger than a depth of the second machine learning model; and fusing the first classification result and the second classification result to obtain the identification result of the video.

In some embodiments, the first machine learning model comprises a first machine learning submodel, a second machine learning submodel, a first fully connected layer, and a first classifier, and the classifying the image comprises: inputting the image into the first machine learning submodel to obtain first feature information; inputting the first feature information into the second machine learning submodel to obtain second feature information; inputting the second feature information into the first full connection layer to obtain third feature information; and inputting the third feature information into the first classifier to obtain the first classification result.

In some embodiments, the second machine learning submodel comprises a plurality of convolutional layers.

In some embodiments, the number of convolutional layers is three.

In some embodiments, wherein the first machine learning model comprises a preset number of first machine learning submodels, a second machine learning submodel, a first fully connected layer, and a first classifier, and the classifying the image comprises: dividing the image into the preset number of information segments that are in one-to-one correspondence with the first machine learning submodels; inputting the information segment into the corresponding first machine learning submodel to obtain first feature information; inputting the first feature information into the second machine learning submodel to obtain second feature information; inputting the second feature information into the first full connection layer to obtain third feature information; and inputting the third feature information into the first classifier to obtain the first classification result.

In some embodiments, the inputting an information segment comprises: extracting a plurality of information frames from the information segment at preset intervals; and inputting the plurality of information frames into the corresponding first machine learning submodel.

In some embodiments, the second machine learning model comprises a first machine learning submodel, a second fully connected layer, and a second classifier, and the classifying the optical flow comprises: inputting the optical flow into the first machine learning submodel to obtain fourth feature information; inputting the fourth feature information into the second fully connected layer to obtain fifth feature information; and inputting the fifth feature information into the second classifier to obtain the second classification result.

In some embodiments, the second machine learning model comprises a preset number of first machine learning submodels, a second fully connected layer, and a second classifier, and the classifying the image comprises: dividing the optical flow into the preset number of information segments which are in one-to-one correspondence to the first machine learning submodels; inputting the information fragment into a corresponding first machine learning submodel to obtain fourth feature information; inputting the fourth feature information into the second fully connected layer to obtain fifth feature information; and inputting the fifth feature information into the second classifier to obtain the second classification result.

In some embodiments, the inputting the information segment comprises:
extracting a plurality of information frames from the information segment at preset intervals; and inputting the plurality of information frames into the corresponding first machine learning submodel.

According to a second aspect of the embodiments of the present disclosure, there is provided a video identification device including: a memory configured to store instructions; a processor coupled to the memory, wherein based on the instructions stored in the memory, the processor is configured to: extract an image and an optical flow from a video; classify the image by using a first machine learning model to obtain a first classification result; classify the optical flow by using a second machine learning model to obtain a second classification result, wherein a depth of the first machine learning model is larger than a depth of the second machine learning model; and fuse the first classification result and the second classification result to obtain the identification result of the video.

In some embodiments, the first machine learning model comprises a first machine learning submodel, a second machine learning submodel, a first fully connected layer, and a first classifier; and the processor is configured to: input the image into the first machine learning submodel to obtain first feature information; input the first feature information into the second machine learning submodel to obtain second feature information; input the second feature information into the first full connection layer to obtain third feature information; and input the third feature information into the first classifier to obtain the first classification result.

In some embodiments, the second machine learning submodels comprises a plurality of convolutional layers.

In some embodiments, the number of convolutional layers is three.

In some embodiments, the first machine learning model comprises a preset number of first machine learning submodels, a second machine learning submodel, a first fully connected layer, and a first classifier, and the processor is configured to: divide the image into the preset number of information segments that are in one-to-one correspondence with the first machine learning submodels; input the information segment into a corresponding first machine learning submodel to obtain first feature information; input the first feature information into the second machine learning submodel to obtain second feature information; input the second feature information into the first full connection layer to obtain third feature information; and input the third feature information into the first classifier to obtain the first classification result.

In some embodiments, the processor is configured to: extract a plurality of information frames from the information segment at preset intervals; and input the plurality of information frames into the corresponding first machine learning submodel.

In some embodiments, the second machine learning model includes a first machine learning submodel, a second fully connected layer, and a second classifier, and the processor is configured to: input the optical flow into the first machine learning submodel to obtain fourth feature information; input the fourth feature information into the second fully connected layer to obtain fifth feature information; and input the fifth feature information into the second classifier to obtain the second classification result.

In some embodiments, the second machine learning model comprises a preset number of first machine learning submodels, a second fully connected layer, and a second classifier, and the processor is configured to: divide the optical flow into the preset number of information segments which are in one-to-one correspondence to the first machine learning submodels; input the information fragment into a corresponding first machine learning submodel to obtain fourth feature information; inputting the fourth feature information into the second fully connected layer to obtain fifth feature information; and inputting the fifth feature information into the second classifier to obtain the second classification result.

In some embodiments, the processor is configured to: extract a plurality of information frames from the information segment at preset intervals; and input the plurality of information frames into the corresponding first machine learning submodel.

According to a third aspect of the embodiments of the present disclosure, there is provided a non-transitory computer-readable storage medium, wherein the computer-readable storage medium stores computer instructions that, when executed by a processor, implement the method as in any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and, together with the description, serve to explain the principles of the disclosure.

The present disclosure will become more fully understood from the detailed description given herein below with reference to the accompanying drawings, wherein:

it should be understood that the dimensions of the various parts illustrated in the drawings are not drawn according to the actual proportional relationship. In addition, the same or similar reference numerals denote the same or similar parts.

FIG. 1 is a schematic flow chart diagram of a video identification method according to one embodiment of the present disclosure;

FIG. 2 is a schematic structural diagram of a machine learning model according to one embodiment of the present disclosure;

FIG. 3 is a schematic structural diagram of a machine learning model according to another embodiment of the present disclosure;

FIG. 4 is a schematic flow chart of a video identification method according to another embodiment of the present disclosure;

FIG. 5 is a schematic structural diagram of a machine learning model according to yet another embodiment of the present disclosure;

FIG. 6 is an illustration of information partitioning according to one embodiment of the present disclosure;

FIG. 7 is a schematic structural diagram of a video identification device according to an embodiment of the present disclosure;

FIG. 8 is a schematic structural diagram of a video identification device according to another embodiment of the present disclosure.

It should be understood that the dimensions of the various parts illustrated in the drawings are not drawn according to the actual proportional relationship. Further, the same or similar reference signs denote the same or similar parts.

DETAILED DESCRIPTION

Various exemplary embodiments of the present disclosure will now be described in detail with reference to the accompanying drawings. The description of the exemplary embodiment(s) is merely exemplary and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials, and numerical values set forth in these embodiments are to be construed as exemplary only and not limiting unless otherwise specifically noted.

The use of "first", "second", and similar terms in this disclosure does not denote any order, quantity, or importance, but rather the terms are used to distinguish one element from another. The word "comprising" or "comprises", and the like, means that elements preceding the word encompass elements listed after the word, and do not exclude the possibility of other elements also being encompassed.

All terms (including technical or scientific terms) used in the present disclosure have the same meaning as commonly understood by one of ordinary skill in the art to which the present disclosure belongs, unless otherwise specifically defined. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and devices known to those of ordinary skill in the relevant art may not be discussed in detail, but are to be considered a part of the specification where appropriate.

The inventors have found through research that, in the related art, in the process of identifying the image in the video frame, a change between adjacent frames is not considered, so that the video identification accuracy cannot be effectively improved.

Accordingly, the present disclosure provides a solution capable of improving video identification accuracy.

Figure 1:
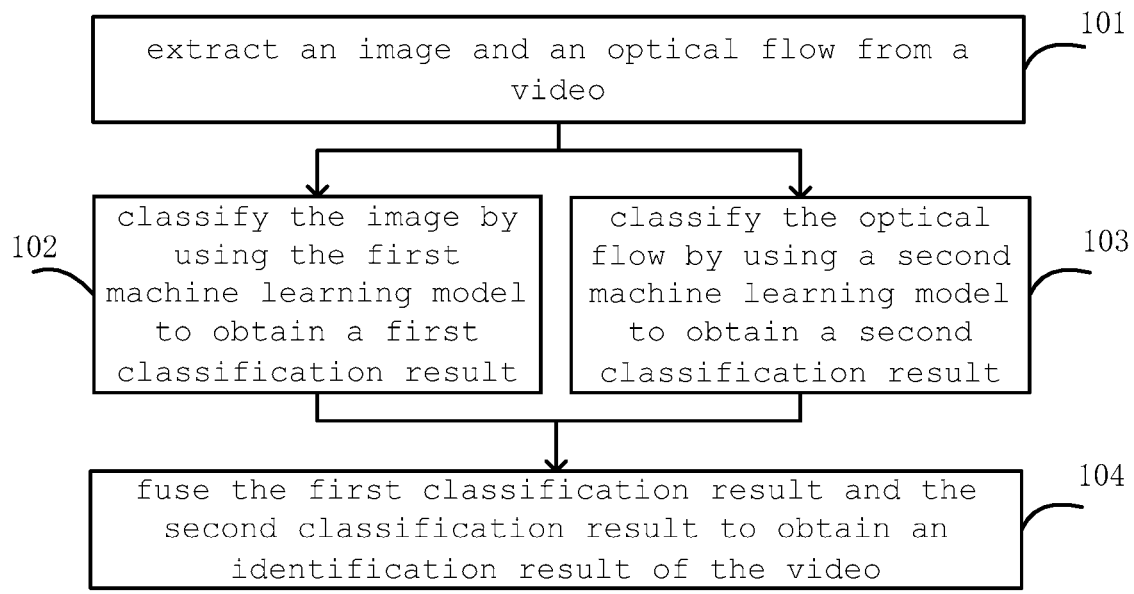

FIG. 1 is a schematic flow chart diagram of a video identification method according to one embodiment of the present disclosure. In some embodiments, the video identification method is performed by a video identification device.

In step 101, an image and an optical flow are extracted from a video.

It should be clarified here that the extracted image is one frame of a video. For example, the extracted image is an image in an RGB color space, or an image in another color space. The optical flow is used for describing the change condition between adjacent frames in the video.

In step 102, the image is classified by using a first machine learning model to obtain a first classification result.

In step 103, the optical flow is classified by using a second machine learning model to obtain a second classification result. A depth of the first machine learning model is larger than a depth of the second machine learning model.

It should be noted that the texture and color of the image are rich, and the texture and content of the optical flow are relatively simple. Therefore, by increasing the depth of the first machine learning model for processing the image, the feature information included in the image can be further extracted, thereby improving the accuracy of video recognition.

In some embodiments, the first machine learning model and the second machine learning model are trained neural networks. For example, the first machine learning model and the second machine learning model are trained convolutional neural networks.

In step 104, the first classification result and the second classification result are fused to obtain the identification result of the video.

In some embodiments, the first classification result and the second classification result may be fused by calculating an average, a weighted average of the first classification result and the second classification results or other suitable means.

For example, when a video segment is identified by using the above embodiment, the first classification result output by the first machine learning model is: the probability that a user extends only the index finger of the right hand is 0.7, the probability that the user extends the thumb and index finger of the right hand simultaneously is 0.2, and the probability of the other cases is 0.1. The second classification result output by the second machine learning model is as follows: the probability that the user extends only the index finger of the right hand is 0.8, the probability that the user extends the thumb and index finger of the right hand simultaneously is 0.1, and the probability of the other cases is 0.1. If the weight of the first machine learning model is 2 and the weight of the second machine learning model is 1, the probability that the user only stretches out the right index finger in the fusion process is:

$$(2 \times 0.7 + 1 \times 0.8)/3 = 0.733$$

And the probability that the user extends the thumb and index finger of the right hand simultaneously is:

$$(2 \times 0.2 + 1 \times 0.1)/3 = 0.167$$

Since $0.733 > 0.167$, it is determined that the user has only stretched the right index finger in the identified video.

Figure 2:
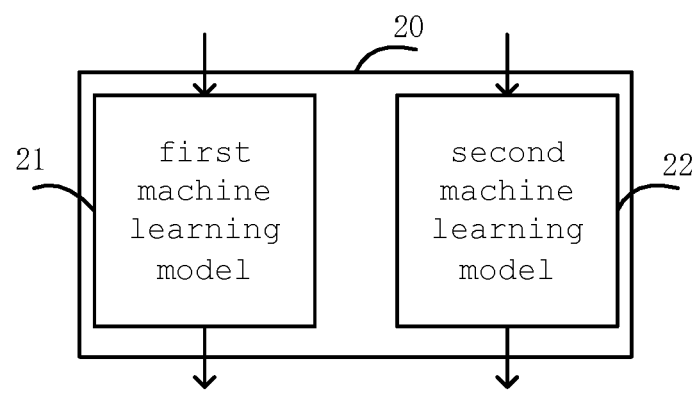

FIG. 2 is a schematic diagram of a machine learning model according to one embodiment of the present disclosure. As shown in FIG. 2, the machine learning model 20 includes a first machine learning model 21 and a second machine learning model 22. A depth of the first machine learning model 21 is larger than a depth of the second machine learning model 22.

In some embodiments, the first machine learning model 21 and the second machine learning model 22 are trained neural networks. For example, the first machine learning model 21 and the second machine learning model 22 are trained convolutional neural networks.

After extracting an image and an optical flow from a video, the image is input to the first machine learning model 21, and the optical flow is input to the second machine learning model 22. The first machine learning model 21 classifies the image to obtain a first classification result. The second machine learning model 22 classifies the optical flow to obtain a second classification result. And then, the first classification result and the second classification result are fused to obtain a video identification result.

In the video identification method provided by the above embodiments of the present disclosure, in the process of identifying a video, the depth of the first machine learning model for image identification is larger than the depth of the second machine learning model for optical flow identification, so that more feature information can be extracted from the image. In addition, the classification results of two different machine learning models are fused, so that in the process of identifying the video, the video identification accuracy can be improved not only by means of the feature information of the image itself but also by means of the condition of variation between adjacent frames.

Figure 3:
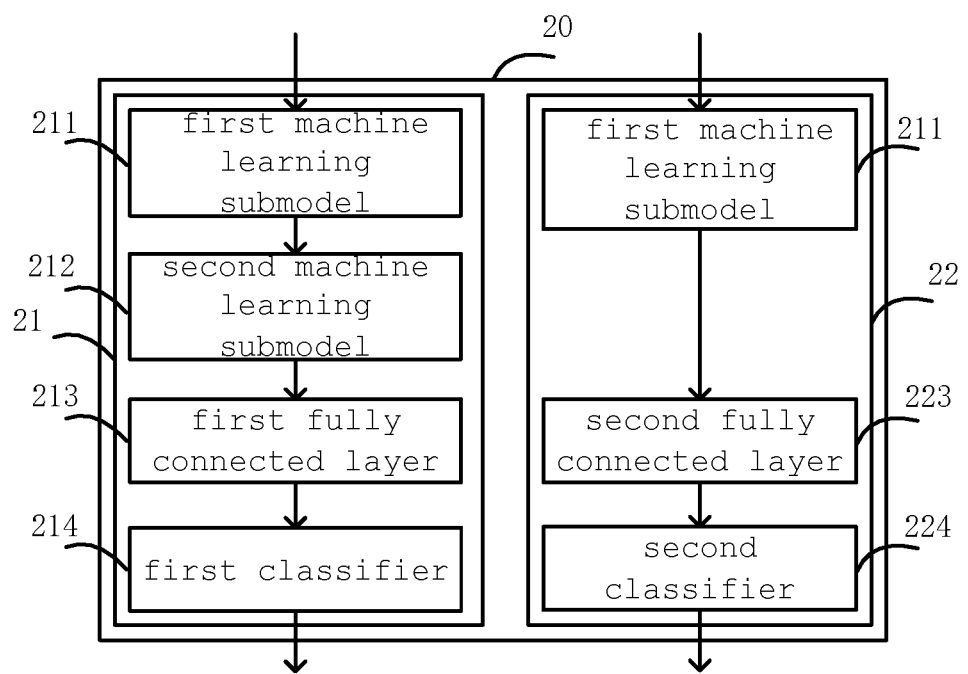

FIG. 3 is a schematic diagram of a machine learning model according to another embodiment of the present disclosure. FIG. 3 differs from FIG. 2 in that, in the embodiment shown in FIG. 3, the first machine learning model 21 comprises a first machine learning submodel 211, a second machine learning submodel 212, a first fully connected layer 213 and a first classifier 214. The second machine learning model 22 includes a first machine learning submodel 211, a second fully connected layer 223, and a second classifier 224.

In some embodiments, the first machine learning submodel 211 and the second machine learning submodel 212 are trained neural networks. For example, the first machine learning submodel 211 and the second machine learning submodel 212 are trained convolutional neural networks.

In some embodiments, the first classifier 214 and the second classifier 224 perform classification processing using a Softmax function or other suitable classification function.

Figure 4:
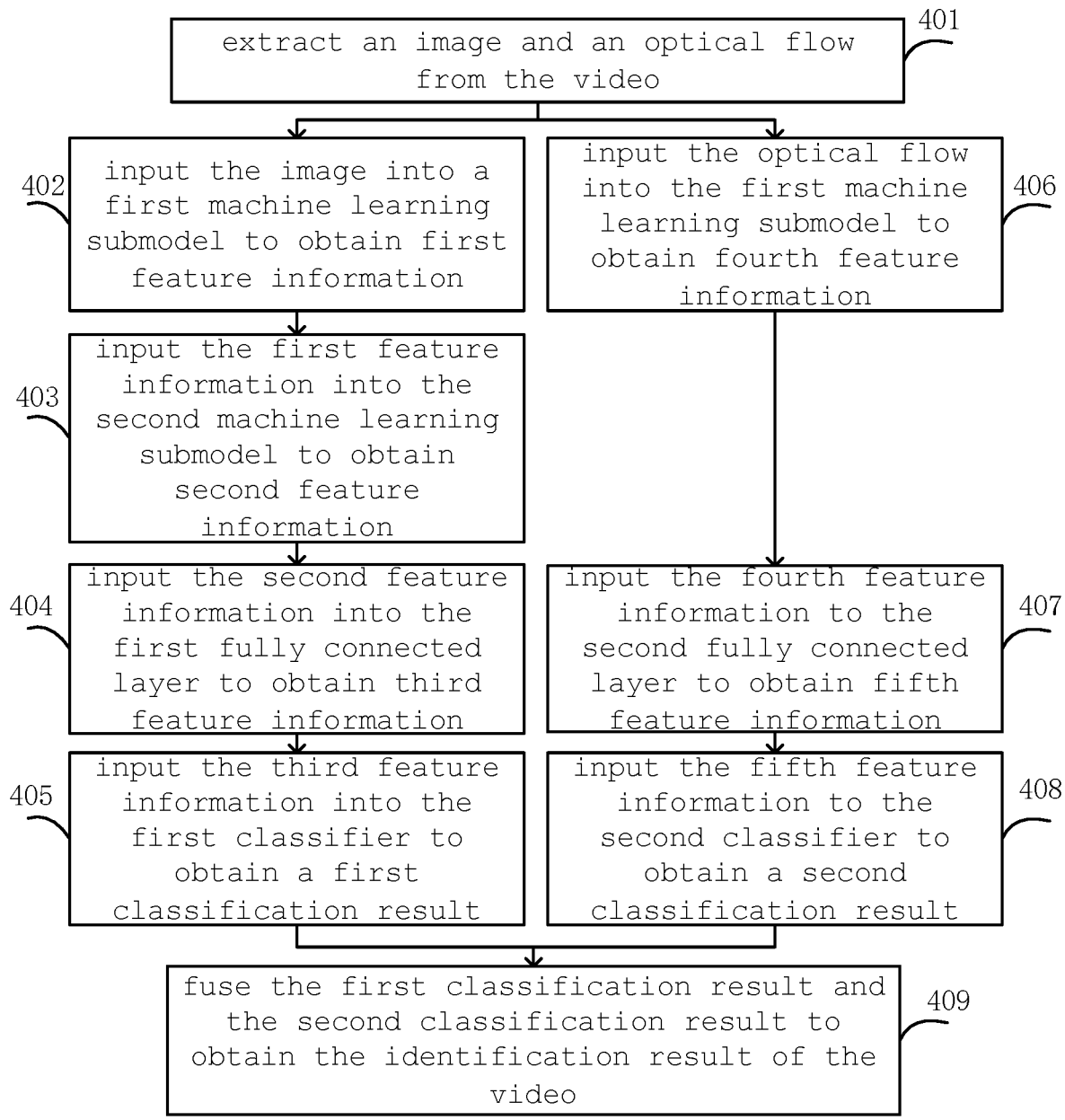

FIG. 4 is a schematic flow chart of a video identification method according to another embodiment of the present disclosure. The machine learning model used is shown in FIG. 3. In some embodiments, the video identification method is performed by a video identification device.

In step 401, an image and an optical flow are extracted from the video.

In step 402, the image is input into a first machine learning submodel to obtain first feature information.

In step 403, the first feature information is input to the second machine learning submodel to obtain second feature information.

In step 404, the second feature information is input into the first fully connected layer to obtain third feature information.

The first fully connected layer can convert local features in the second feature information into global features, so as to improve the accuracy of video identification.

In step 405, the third feature information is input into the first classifier to obtain the first classification result.

In step 406, the optical flow is input into the first machine learning submodel to obtain fourth feature information.

In step 407, the fourth feature information is input to the second fully connected layer to obtain fifth feature information.

The second fully connected layer can convert local features in the fourth feature information into global features, so as to improve the accuracy of video identification.

In step 408, the fifth feature information is input to the second classifier to obtain the second classification result.

In step 409, the first classification result and the second classification result are fused to obtain the identification result of the video.

It should be noted that, in the case where the second machine learning submodel includes a plurality of the convolutional layers, the video identification accuracy is improved as the number of the convolutional layers increases. However, after the number of the convolution layers exceeds a threshold value, the video identification accuracy is not further improved, and the calculation cost is also obviously increased.

In some embodiments, the number of convolutional layers in the second machine learning submodel is three. Therefore, the ideal video recognition accuracy can be obtained, and the calculation cost can be controlled within an acceptable range.

Figure 5:
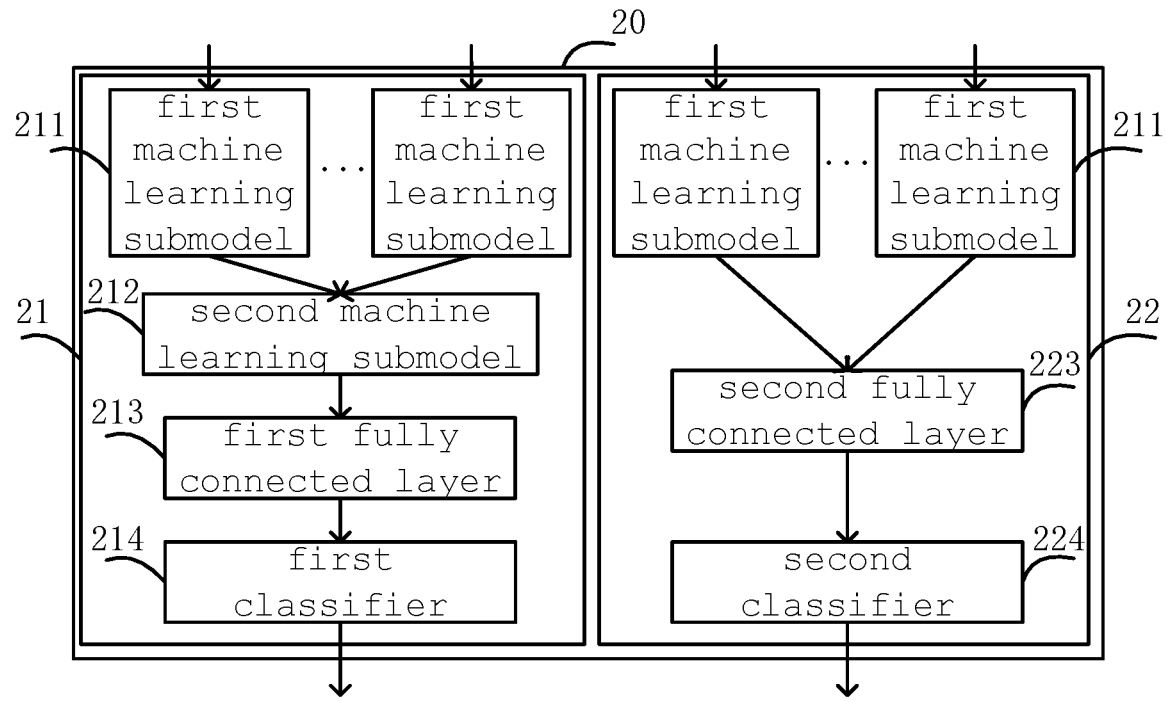

FIG. 5 is a schematic diagram of a machine learning model according to yet another embodiment of the present disclosure. FIG. 5 differs from FIG. 3 in that in the embodiment shown in FIG. 5, the first machine learning model 21 includes a plurality of first machine learning submodels 211. The second machine learning model 22 includes a plurality of first machine learning submodels 211. These first machine learning submodels 211 can process input information independently of each other, and thus can effectively improve processing efficiency.

In some embodiments, the number of first machine learning submodels 211 in the first machine learning model 21 is the same as the number of first machine learning submodels 211 in the second machine learning model 22.

In some embodiments, three first machine learning submodels 211 are respectively provided in the first machine learning model 21 and the second machine learning model 22. Thus, a desired processing speed can be obtained, and the calculation cost can be controlled within an acceptable range.

Figure 6:
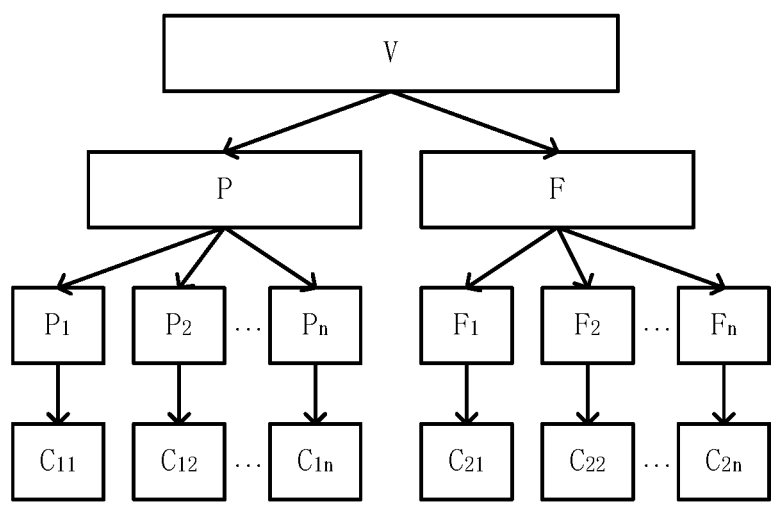

FIG. 6 is a schematic diagram of information partitioning according to one embodiment of the present disclosure.

As shown in FIG. 6, an image P and an optical flow F are extracted from the video segment V. In case that the first machine learning model includes n first machine learning submodels, the image P input to the first machine learning model is also divided into n pieces of information $P_1$, $P_2$, ... $P_n$. The information segments are in one-to-one correspondence to the first machine learning submodels. Then, $P_1$ is input into the corresponding first machine learning submodel $C_{11}$, and $P_2$ is input into the corresponding first machine learning submodel $C_{12}$, ..., and $P_n$ is input into the corresponding first machine learning submodel $C_{1n}$.

In some embodiments, the information segments $P_1$, $P_2$, ..., $P_n$ have the same length. Therefore, the calculation load can be uniformly distributed, and the overall processing efficiency is improved.

Further, in the case where the second machine learning model includes n first machine learning submodels, the optical flow F input to the second machine learning model is also divided into n pieces of information $F_1$, $F_2$, ... $F_n$. The information segments are in one-to-one correspondence to the first machine learning submodels. Then, $F_1$ is input into the corresponding first machine learning submodel $C_{21}$, $F_2$ is input into the corresponding first machine learning submodel $C_{22}$, ..., and $F_n$ is input into the corresponding first machine learning submodel Can.

In some embodiments, the information segments $F_1$, $F_2$, ... $F_n$ have the same length. Therefore, the calculation load can be uniformly distributed, and the overall processing efficiency is improved.

In some embodiments, a plurality of information frames are extracted from each of the information pieces at preset intervals. The extracted information frames are input into the corresponding first machine learning submodels, so that the information processing amount of the first machine learning submodel can be reduced.

For example, a starting point i1 is randomly selected from the information piece $P_1$. M information frames i1, i2, . . . im are then selected as equally spaced in the information fragment $P_1$, starting from the start i1. If the selected information frame ij is located at the end of the information segment S1 during the selection process, the selection of the next information frame ij+1 is continued starting from the first frame of the information segment S1.

It is noted that although the various steps of the method are shown in the drawings in a certain order, this does not mean that the method steps must be performed in the order shown, but rather can be performed in reverse or parallel order without departing from the spirit and principles of the present invention.

Figure 7:
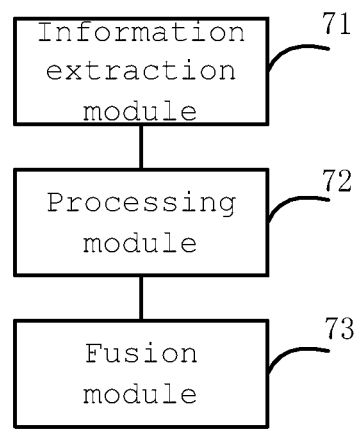

FIG. 7 is a schematic structural diagram of a video identification device according to an embodiment of the present disclosure. As shown in FIG. 7, the video recognition apparatus includes an information extraction module 71, a processing module 72, and a fusion module 73.

The information extraction module 71 extracts an image and an optical flow map from the video.

It should be explained here that the extracted image is one frame of a video. For example, the extracted image is an image in an RGB color space, or an image in another color space.

In addition, the optical flow is used for describing the change between adjacent frames in the video.

The processing module 72 uses a first machine learning model to classify the image to obtain a first classification result, and uses a second machine learning model to classify the optical flow to obtain a second classification result. A depth of the first machine learning model is larger than a depth of the second machine learning model.

It should be noted that the texture and color of the image are rich, and the texture and content of the optical flow map are relatively single. Therefore, by increasing the depth of the first machine learning model for processing the image, the feature information included in the image can be further extracted, thereby improving the accuracy of video identification.

In some embodiments, the first machine learning model and the second machine learning model are trained neural networks. For example, the first machine learning model and the second machine learning model are trained convolutional neural networks.

The fusion module 73 fuses the first classification result and the second classification result to obtain an identification result of the video.

In some embodiments, the first and second classification results may be fused by calculating an average, a weighted average of the first and second classification results or other suitable means.

For example, when the video segment is identified by using the above embodiment, the first classification result output by the first machine learning model is: the probability that the user extends only the index finger of the right hand is 0.7, the probability that the user extends the thumb and index finger of the right hand simultaneously is 0.2, and the probability of the other cases is 0.1. The second classification result output by the second machine learning model is as follows: the probability that the user extends only the index finger of the right hand is 0.8, the probability that the user extends the thumb and index finger of the right hand simultaneously is 0.1, and the probability of the other cases is 0.1. If the weight of the first machine learning model is 2 and the weight of the second machine learning model is 1, the probability that the user only stretches out the index finger of the right hand in the fusion process is:

(2×0.7+1×0.8)/3=610.733

And the probability that the user extends the thumb and index finger of the right hand simultaneously is:

(2×0.2+1×0.1)/3=610;0.167

Since 0.733>0.167, it is determined that the user has only stretched the index finger of the right hand in the identified video.

In the video identification device provided by the above embodiments of the present disclosure, in the process of identifying a video, the depth of the first machine learning model for image identification is larger than the depth of the second machine learning model for optical flow identification, so that more feature information can be extracted from the image. In addition, the classification results of two different machine learning models are fused, so that in the process of identifying the video, the video identification accuracy is improved by means of the feature information of the image itself and the condition of variation between adjacent frames.

In some embodiments, as shown in FIG. 3, the first machine learning model includes a first machine learning submodel, a second machine learning submodel, a first fully connected layer, and a first classifier.

The processing module 72 inputs the image into the first machine learning submodel to obtain first feature information. The processing module 72 inputs the first feature information into the second machine learning submodel to obtain second feature information. The processing module 72 inputs the second feature information into the first fully connected layer to obtain third feature information. The processing module 72 inputs the third feature information into the first classifier to obtain the first classification result.

In some embodiments, the first classifier performs the classification process using a Softmax function or other suitable classification function.

In some embodiments, the second machine learning submodel includes a plurality of convolutional layers. For example, the number of convolutional layers in the second machine learning submodel is 3. Therefore, the ideal video identification accuracy can be obtained, and the calculation cost can be controlled within an acceptable range.

In some embodiments, as shown in FIG. 3, the second machine learning model includes a first machine learning submodel, a second fully connected layer, and a second classifier.

The processing module 72 inputs the optical flow into the first machine learning submodel to obtain fourth feature information. The processing module 72 inputs the fourth feature information into the second fully connected layer to obtain fifth feature information. The processing module 72 inputs the fifth feature information into the second classifier to obtain the second classification result.

In some embodiments, as shown in FIG. 5, the first machine learning model and the second machine learning model each include a preset number of first machine learning submodels.

As shown in FIG. 6, in the case where the first machine learning model includes n first machine learning submodels, the processing module 72 divides the image P input to the first machine learning model into n pieces of information $P_1$, $P_2$, ... $P_n$. The information segments are in one-to-one correspondence to the first machine learning submodels. Next, the processing module 72 inputs each piece of information into a corresponding first machine learning submodel of the first machine learning model.

In some embodiments, the information segments $P_1$, $P_2$, ... $P_n$ have the same length. Therefore, the calculation load can be uniformly distributed, and the overall processing efficiency is improved.

Further, where the second machine learning model includes n first machine learning submodels, the processing module 72 divides the optical flow F input to the second machine learning model into n pieces of information $F_1$, $F_2$, ... $F_n$. The information segments correspond to the first machine learning submodels one to one. Next, the processing module 72 inputs each piece of information into a corresponding first machine learning submodel of the second machine learning model.

In some embodiments, the information segments $F_1$, $F_2$, ... $F_n$ have the same length. Therefore, the calculation load can be uniformly distributed, and the overall processing efficiency is improved.

In some embodiments, a plurality of information frames are extracted from each of the information pieces at preset intervals. The extracted information frames are input into the corresponding first machine learning submodel, so that the amount of information processing of the first machine learning submodel can be reduced.

In some embodiments, the functional modules may be implemented as a general purpose processor, a programmable logic controller (PLC), a digital signal processor (DSP), an application specific integrated circuit (ASIC), a field-programmable gate array (FPGA) or other programmable logic device, discrete gate or transistor logic devices, discrete hardware components, or any suitable combination thereof for performing the functions described in the present disclosure.

Figure 8:
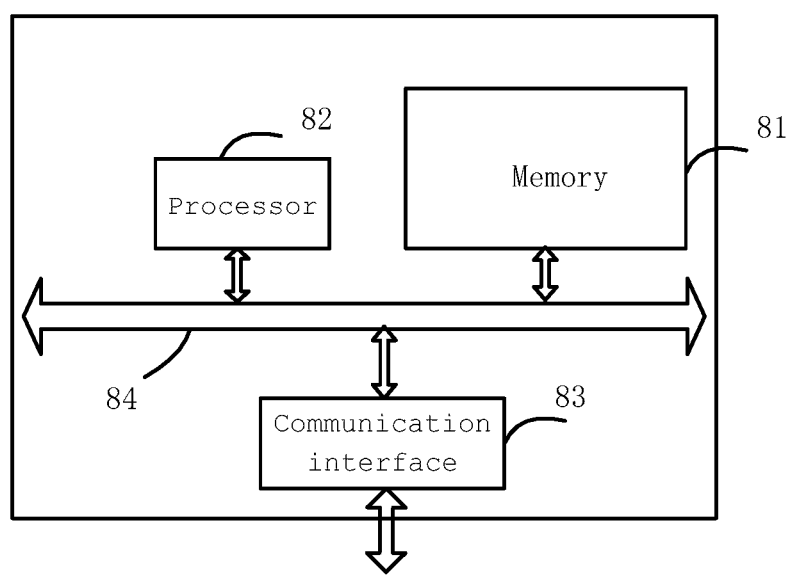

FIG. 8 is a schematic structural diagram of a video identification device according to another embodiment of the present disclosure. As shown in FIG. 8, the video identification device includes a memory 81 and a processor 82.

The memory 81 is used to store instructions. The processor 82 is coupled to the memory 81. The processor 82 is configured to implement the method as referred to in any of the embodiments of FIGS. 1 and 4 based on the execution of the memory-stored instructions.

As shown in FIG. 8, the video identification device further includes a communication interface 83 for information interaction with other devices. Also, the apparatus also includes a bus 84 through which the processor 82, the communication interface 83, and the memory 81 communicate with each other.

The memory 81 may include a random access memory (RAM), and may further include a non-volatile memory (NVM). Such as at least one disk storage. The memory 81 may also be a memory array. The storage 81 may also be blocked and the blocks may be combined into a virtual volume according to certain rules.

Further, the processor 82 may be a central processing unit, or may be an ASIC (Application Specific Integrated Circuit), or one or more Integrated circuits configured to implement embodiments of the present disclosure.

The present disclosure also provides a non-transitory computer-readable storage medium. The computer readable storage medium has stored thereon computer instructions which, when executed by a processor, implement a method as referred to in any of the embodiments of FIGS. 1 and 4.

By applying the solution provided by the present disclosure to the gesture dataset 20 BN-JESTER, 95.6% accuracy can be obtained.

Thus far, embodiments of the present disclosure have been described in detail. Some details that are well known in the art have not been described in order to avoid obscuring the concepts of the present disclosure. Those skilled in the art can fully understand how to implement the technical solutions disclosed herein based on the above description.

While certain specific embodiments of the present disclosure have been described in detail by way of example, it should be understood by those skilled in the art that the above examples are illustrative only and are not intended to limit the scope of the present disclosure. It will be understood by those skilled in the art that modifications may be made to the above embodiments or equivalents may be substituted for elements thereof without departing from the scope and spirit of the present disclosure. The scope of the present disclosure is defined by the appended claims.

What is claimed is:

1. A video identification method, comprising:
extracting an image and an optical flow from a video;
classifying the image by using a first machine learning model to obtain a first classification result, wherein the first machine learning model comprises a first machine learning submodel, a second machine learning submodel, a first fully connected layer, and a first classifier, and the classifying the image comprises:
inputting the image into the first machine learning submodel to obtain first feature information;
inputting the first feature information into the second machine learning submodel to obtain second feature information;
inputting the second feature information into the first fully connected layer to obtain third feature information; and
inputting the third feature information into the first classifier to obtain the first classification result;
classifying the optical flow by using a second machine learning model to obtain a second classification result, wherein a depth of the first machine learning model is larger than a depth of the second machine learning model; and
fusing the first classification result and the second classification result to obtain an identification result of the video.

2. The identification method of claim 1, wherein the second machine learning submodel comprises a plurality of convolutional layers.

3. The identification method of claim 2, wherein the number of the convolutional layers is three.

4. The identification method of claim 1, wherein the first machine learning model comprises a preset number of first machine learning submodels, a second machine learning submodel, a first fully connected layer, and a first classifier, and the classifying the image comprises:
dividing the image into a preset number of information segments that are in one-to-one correspondence with the preset number of first machine learning submodels;
inputting the information segment into the corresponding first machine learning submodel to obtain first feature information;
inputting the first feature information into the second machine learning submodel to obtain second feature information;
inputting the second feature information into the first fully connected layer to obtain third feature information; and
inputting the third feature information into the first classifier to obtain the first classification result.

5. The identification method of claim 4, wherein the inputting an information segment comprises:
extracting a plurality of information frames from the information segment at preset intervals; and
inputting the plurality of information frames into the corresponding first machine learning submodel.

6. The identification method of claim 1, wherein the second machine learning model comprises a first machine learning submodel, a second fully connected layer, and a second classifier, and the classifying the optical flow comprises:
inputting the optical flow into the first machine learning submodel to obtain fourth feature information;
inputting the fourth feature information into the second fully connected layer to obtain fifth feature information; and
inputting the fifth feature information into the second classifier to obtain the second classification result.

7. The identification method of claim 1, wherein the second machine learning model comprises a preset number of first machine learning submodels, a second fully connected layer, and a second classifier, and the classifying the image comprises:
dividing the optical flow into a preset number of information segments which are in one-to-one correspondence to the preset number of first machine learning submodels;
inputting the information segment into a corresponding first machine learning submodel to obtain fourth feature information;
inputting the fourth feature information into the second fully connected layer to obtain fifth feature information; and
inputting the fifth feature information into the second classifier to obtain the second classification result.

8. The identification method of claim 7, wherein the inputting the information segment comprises:
extracting a plurality of information frames from the information segment at preset intervals; and
inputting the plurality of information frames into the corresponding first machine learning submodel.

9. A non-transitory computer-readable storage medium, wherein the computer-readable storage medium stores computer instructions that, when executed by a processor, implement the method of claim 1.

10. A video identification device, comprising:
a memory configured to store instructions;
a processor coupled to the memory, wherein based on the instructions stored in the memory, the processor is configured to:
extract an image and an optical flow from a video;
classify the image by using a first machine learning model to obtain a first classification result, wherein the first machine learning model comprises a first machine learning submodel, a second machine learning submodel, a first fully connected layer, and a first classifier; and the processor is configured to:
input the image into the first machine learning submodel to obtain first feature information;
input the first feature information into the second machine learning submodel to obtain second feature information;
input the second feature information into the first fully connected layer to obtain third feature information; and
input the third feature information into the first classifier to obtain the first classification result;
classify the optical flow by using a second machine learning model to obtain a second classification result, wherein a depth of the first machine learning model is larger than a depth of the second machine learning model; and
fuse the first classification result and the second classification result to obtain an identification result of the video.

11. The identification device of claim 10, wherein the second machine learning submodel comprises a plurality of convolutional layers.

12. The identification device of claim 11, wherein the number of the convolutional layers is three.

13. The identification device of claim 10, wherein the first machine learning model comprises a preset number of first machine learning submodels, a second machine learning submodel, a first fully connected layer, and a first classifier, and the processor is configured to:
divide the image into a preset number of information segments that are in one-to-one correspondence with the preset number of first machine learning submodels;
input the information segment into a corresponding first machine learning submodel to obtain first feature information;
input the first feature information into the second machine learning submodel to obtain second feature information;
input the second feature information into the first fully connected layer to obtain third feature information; and
input the third feature information into the first classifier to obtain the first classification result.

14. The identification device of claim 13, wherein the processor is configured to:
extract a plurality of information frames from the information segment at preset intervals; and
input the plurality of information frames into the corresponding first machine learning submodel.

15. The identification device of claim 10, wherein the second machine learning model includes a first machine learning submodel, a second fully connected layer, and a second classifier, and the processor is configured to:
input the optical flow into the first machine learning submodel to obtain fourth feature information;
input the fourth feature information into the second fully connected layer to obtain fifth feature information; and
input the fifth feature information into the second classifier to obtain the second classification result.

16. The identification device of claim 10, wherein the second machine learning model comprises a preset number of first machine learning submodels, a second fully connected layer, and a second classifier, and the processor is configured to:
divide the optical flow into a preset number of information segments which are in one-to-one correspondence to the preset number of first machine learning submodels;
input the information segment into a corresponding first machine learning submodel to obtain fourth feature information;
inputting the fourth feature information into the second fully connected layer to obtain fifth feature information; and
inputting the fifth feature information into the second classifier to obtain the second classification result.

17. The identification device of claim 16, wherein the processor is configured to:
extract a plurality of information frames from the information segment at preset intervals; and
input the plurality of information frames into the corresponding first machine learning submodel.

* * * * *